United States Patent Office 2,988,153
Patented June 13, 1961

2,988,153
PROPELLER-DRIVING POWER PLANT INCLUDING TORQUE-RESPONSIVE MEANS
Lionel Haworth, Loughborough, Donald McLean, Derby, Philip Burrows Smith, Mickleover, and Roy Martin Heathcote, Belper, England, assignors to Rolls-Royce Limited, Derby, England, a British company
Filed Aug. 8, 1958, Ser. No. 754,013
Claims priority, application Great Britain Aug. 13, 1957
16 Claims. (Cl. 170—135.72)

This invention comprises improvements in or relating to propeller-driving power plants for aircraft and is concerned with such power plants in which epicyclic gearing is provided between the propeller and an engine of the power plant. Such a power plant will be referred to as "a power plant as specified."

Under certain conditions of operation of a power plant as specified, for instance when the engine fails or when due to an engine failure the power output of the engine is substantially reduced, the propeller may drive the engine and as a result the engine may tend to overspeed. In the following description, the epicyclic gearing will be referred to as transmitting "positive torque" when the engine is driving the propeller and as transmitting "negative torque" when the propeller is driving the engine.

According to the present invention, in a power plant as specified, a torque reaction member of the epicyclic gearing is supported within fixed structure for limited movement during torque transmission and means is provided to be actuated when the movement of the torque reaction member which occurs on transmission of negative torque, exceeds a selected value to give an indication of the extent of such negative torque conditions or to effect a desired control on the power plant.

According to a preferred feature of this invention said means is arranged to coarsen the pitch of the blades of the propeller driven by the power plant when said selected value of negative torque is exceeded.

According to a feature of the invention it may be arranged that said selected value of negative torque is varied in accordance with flight conditions. Thus the selected value may be made greater during descent and landing of the aircraft than during steady flight conditions or take-off and climb.

The torque reaction member may be supported to partake of its limited movement against an opposing load which increases as the torque reaction member is displaced under negative torque conditions, and the means to give an indication of negative torque conditions or to effect a control action is arranged to be actuated when the torque reaction member has reached a selected position, for instance a selected angular position in the case where the torque reaction member is the annulus gear, in its movement under negative torque transmitting conditions. The opposing load, may, for instance, be applied hydraulically, the movement of the torque reaction member actuating a valve controlling the hydraulic load applied to the torque reaction member such that the hydraulic load increases as the negative torque increases. In constructions in which the torque reaction member is an annulus gear of the epicyclic gearing, the annulus gear may be supported for limited rotation in fixed structure by piston and cylinder means to which the pressure fluid is fed, the angular movement of the torque reaction member causing movement of the piston means against an increasing hydraulic load on increase of negative torque, the valve controlling the fluid pressure being incorporated in a piston and cylinder device and being actuated by relative movement of the piston of the device in its cylinder.

According to a feature of the present invention, the torque reaction member of the epicyclic gearing is an annulus gear, and the annulus gear is supported within fixed structure by a large number of piston and cylinder devices to which pressure fluid is fed, it being arranged that some of the piston and cylinder devices support the torque reaction loads during positive torque transmission and the remainder support torque reaction loads in negative torque transmission.

In United States Patent No. 2,825,247, granted March 4, 1958, there is described an epicyclic gearing for use in aircraft propeller-driving power plant, in which the annulus gear of the epicyclic gearing is helically toothed and is supported in fixed structure by a large number of piston and cylinder devices fed with liquid under pressure, and the piston and cylinder devices are arranged with their axes inclined to the plane of the annulus gear so that the annulus gear is supported both against axial loads produced in torque transmission and against tangential loads produced in torque transmission. Such an arrangement is employed in one preferred construction of the present invention, some of said piston and cylinder devices being arranged to support the annulus gear during positive torque transmission and others during negative torque transmission. For instance, there may be about 28 of such piston and cylinder devices distributed around the annulus gear and a small number of them may be employed during negative torque transmission. In a modified arrangement, only the piston and cylinder devices which support the annulus gear under positive torque conditions have their axes inclined, and the piston and cylinder devices which support the annulus gear under negative torque conditions, have their axes directed axially of the annulus gear, there being means by which the pistons of the devices are displaced due to rotation of annulus gear. For instance, rotation of the annulus gear may cause rocking of bell-cranks which displace the pistons of the axially-arranged piston and cylinder devices.

In United States Patent No. 2,825,247, granted March 4, 1958, one of the piston and cylinder devices incorporates a valve controlling the pressure of the liquid fed to the piston and cylinder devices, and in accordance with a feature of the present invention one of the piston and cylinder devices which is employed during negative torque transmission, incorporates valve means controlling the pressure of the fluid supplied to the piston and cylinder devices either both during positive torque transmission and during negative torque transmission, or during positive torque transmission only, there being in this case additional manually-settable valve means for controlling the pressure during negative torque transmission.

In one construction of such master piston and cylinder device the piston divides the cylinder of the master device into two spaces, there being a pressure fluid supply connection to the first space and an outlet from the second space, and there being a flow connection between the two spaces. It is arranged that on movement in one sense the piston co-operates with the outlet to restrict flow therethrough to determine the liquid pressure acting in the piston and cylinder devices operative during torque transmission in one sense, the flow connection permitting a substantially free flow between the spaces. On movement in the other sense, the piston co-operates with said flow connection to restrict flow therethrough between the spaces thereby to determine the fluid pressure in the first space of the master piston and cylinder device and thus within the piston and cylinder devices operative during torque transmission in the other sense, the outlet being opened and affording a substantially free flow therethrough. The movement of the piston in said other sense is preferably arranged to occur during negative torque transmission and in this case there may be provided a spring-loaded valve connection between the first and second spaces of the master piston and cylinder to open when the pressure within the first space reaches a selected value corresponding to the selected value of negative torque at which a control action is required to be effected, thereby to allow a rapid movement of the piston in the sense of reducing the volume of the first space and corresponding movement of the annulus gear, which movement is employed to effect the control action.

In another construction of master piston and cylinder device, which is employed to control pressure under positive-torque conditions only and when additional manually-settable valve means is provided to control pressure under negative torque conditions, the piston of the master device divides its cylinder into a first space and a second space, there being a pressure supply connection to the first space, an outlet from the second space, and a flow connection between the spaces, said piston, when in a position occupied under positive-torque conditions, rendering operative the flow connection between said spaces and co-operating with said outlet to restrict the outflow therethrough, and said piston, when in a position occupied under negative torque conditions, rendering said flow connection inoperative, said additional manually-settable valve means being in a further flow connection between the pressure supply connection and the second space.

Some arrangements of epicyclic gearing suitable for use in a propeller, driving power plant of an aircraft and incorporating the above and other features of this invention will now be described, reference being made in the description to the accompanying drawings, in which—

Figure 1:
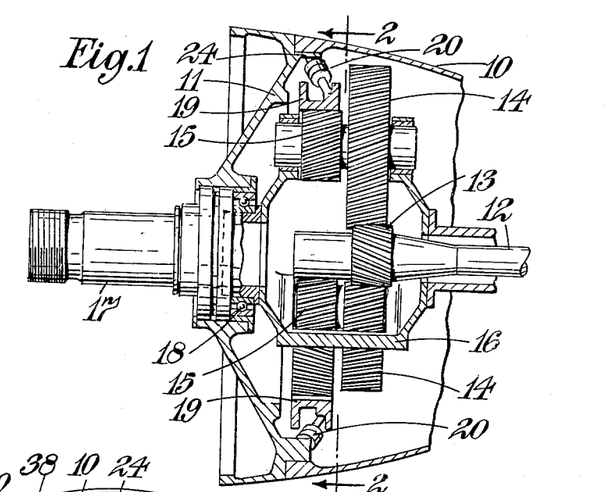
FIGURE 1 is an axial section through the epicyclic gearing.

Referring to FIGURE 1, the epicyclic gearing illustrated is housed within fixed structure comprising an outer fairing 10 and an end cover plate 11 and the gearing comprises an input shaft 12 which is driven by the engine of the power plant and carries a helically toothed sun gear 13. The epicyclic gearing also comprises a plurality of compound planet gear elements each of which includes a pinion 14 meshing with the sun gear 13 and a second pinion 15, the compound planet gears being supported by a planet carrier 16 which is secured to the propeller driving shaft 17 which is supported in bearings 18 in the cover plate 11. The pinions 15 of the compound planet gear elements mesh with an annulus gear 19 which forms the torque reaction member of the epicyclic gearing.

The pinions 15 and the annulus gear 19 are helically toothed and thus during torque transmission loads are applied to the annulus gear 19 tending to displace it axially and to displace it angularly within the fixed structure 10, 11. The hand of the helical teeth of these gears is selected so that during positive torque transmission the axial loads on the annulus gear tend to displace it to the left as viewed in FIGURE 1.

Figure 2:
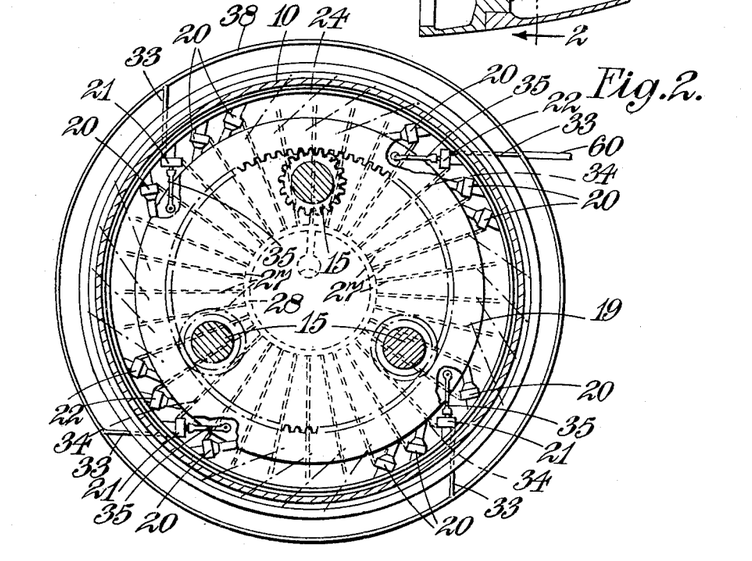
FIGURE 2 is a section on the line 2—2 of FIGURE 1.

Referring now to FIGURES 1 and 2, it will be seen that the annulus gear 19 is supported from the fixed structure 10, 11 by means of a large number of piston and cylinder devices, each of which has its axis inclined to the plane of the annulus gear in a similar way, the angle of inclination being selected so that the axial and tangential loads produced on the annulus gear in torque transmission are supported hydraulically. Of the piston and cylinder devices the majority, referenced 20, are arranged to support the annulus gear during positive torque transmission, and the remainder are arranged to support the annulus gear during negative torque transmission. In FIGURE 2, three of these piston and cylinder devices are referenced 21 and the fourth is referenced 22. The piston and cylinder device 22 acts as a master device for controlling the fluid pressure within the other devices both during torque transmission and negative torque transmission.

Figure 3:
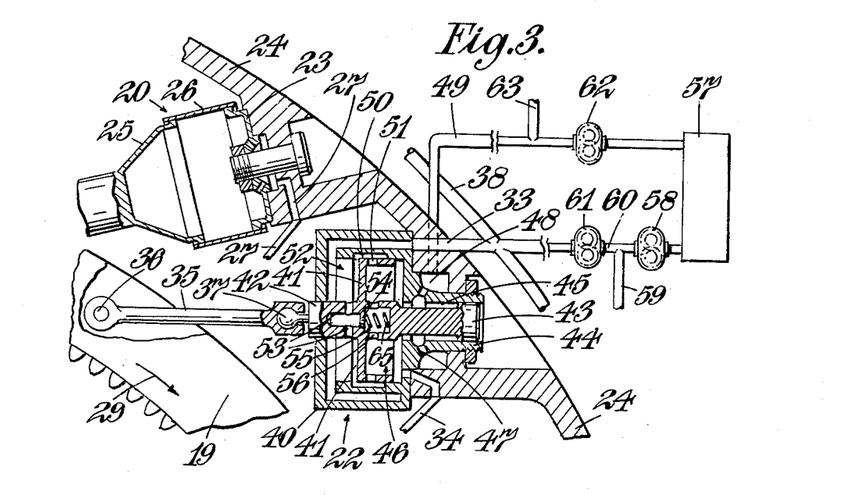
FIGURE 3 is a view of part of FIGURE 2 drawn to a larger scale and showing parts in section.

Referring now also to FIGURE 3 the piston and cylinder devices 20 each comprise a cup member 23 secured to a flange 24 on the cover plate 11, a cup member 25 secured to the annulus gear 19 and a cylinder 26 extending between the cup members 23 and 25 which fit and slide within the ends of the cylinder 26. A pressure fluid connection 27 is provided to the space within the cylinder 26, the connection 27 being fed from a ring manifold 28 (FIGURE 2). During positive torque transmission the annulus gear 19 tends to move in the direction of arrows 29 in FIGURE 3 so that the piston and cylinder devices 20 tend to collapse and that the pressure fluid supplied to within the cylinders 26 opposes this movement.

Figure 4:
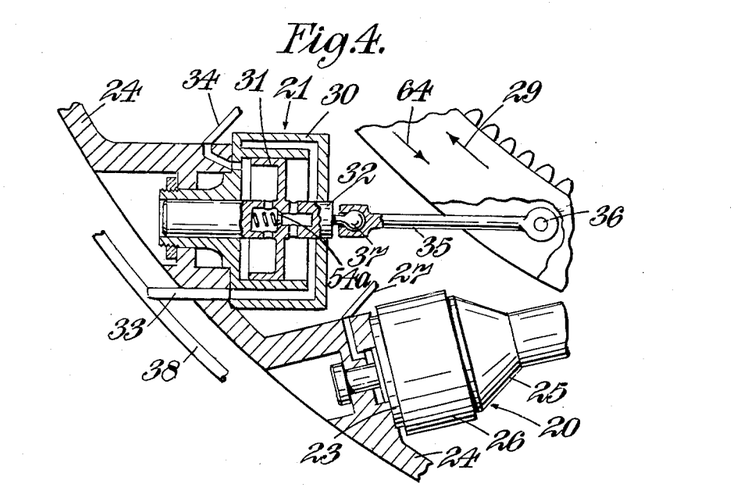
FIGURE 4 is a view corresponding to FIGURE 3 showing details of construction of other parts indicated in FIGURE 2, FIGURES 5, 6 and 7 show alternative pressure fluid supply systems to that illustrated in FIGURE 3.

Referring now also to FIGURE 4, each of the piston and cylinder devices 21 comprises a cylinder 30 secured on the flange 24 of the cover plate 11, a piston 31 working in the cylinder and having a piston rod 32 extending from the cylinder 30 towards the annulus gear 19, a pressure connection 33 to the right-hand end of the cylinder 30 and a pressure connection 34 to the left-hand end of the cylinder. The piston 31 is connected by a link 35 to the annulus gear, the link being pivoted to the annulus gear at 36 and having a ball and socket connection 37 to the piston rod 32. The pressure connection 34 leads to the ring manifold 28 and the pressure connection 33 leads to a second ring manifold 38.

Referring again to FIGURE 3, the master piston and cylinder device 22 is shown in section and it will be seen that it is generally similar in construction to the piston and cylinder devices 21. The master piston and cylinder device 22 comprises a cylinder 40 mounted on the flange 24 of the cover plate 11, a piston 41 working in the cylinder, a piston rod 42 which is connected by a linkage as described for the piston and cylinder devices 21 to the annulus gear 19, a pressure connection 34 to the ring manifold 28 and a pressure connection 33 to the ring manifold 38.

The piston 41 has a central projection 43 which slides within a hollow boss 44 forming part of the cylinder 40. The projection 43 had longitudinal cutaways 45 in its length, the cutaways extending to within the cylinder space 46 on the right-hand side of the piston 41. The hollow boss is provided with a ring of drillings 47 placing the interior of the boss in communication with an annular chamber 48 having an outlet connection 49.

The cylinder 40 is provided in its internal wall with an annular channel 50 which is covered to a greater or less extent by the piston 41 during its movement within the cylinder and the skirt of the piston is provided with holes 51 placing the channel 50 in communication with the cylinder space 46. The pressure fluid connection 33 of the master piston and cylinder device 22 leads to the left-hand cylinder space 52, and the channel 50 and holes 51 afford a connection between the cylinder spaces 52 and 46.

The piston rod 42 has a central bore communicating with the cylinder space 52 through holes 53 and communicating via a spring loaded valve 54 with a chamber 55 within the projection 43, this chamber being in communication with the cylinder space 46 via holes 56. Similar spring-loaded valves 54a arranged to blow off at a slightly higher pressure than valve 54 are provided in the piston and cylinder devices 21 as illustrated in FIGURE 4.

The piston and cylinder devices are fed with operating liquid from the lubricating system of the engine. This lubricating system as shown in FIGURE 3 comprises a reservoir 57 from which oil is drawn by a pump 58 to be delivered to the engine via pipe 59. A branch pipe 60 containing a further pump 61 leads from the pipe 59 to the ring manifold 38. The lubricating system also comprises a scavenge pump 62 drawing lubricant from the engine via pipe 63 and returning it to the reservoir 57, and the outlet connection 49 is connected to the oil return pipe 63.

In operation of the mechanism as so far described, during positive torque transmission, the piston 41 of the master piston and cylinder device 22 tends to move to the right as viewed in FIGURE 3 so that the cutaways 45 in the projection 43 tend to enter to a greater extent into the hollow boss 41. The extent of projection of the cutaways 45 is selected to provide a restricted outlet from the space 46 so that pressure builds up within the cylinder spaces 46, 52 of the master piston and cylinder device. During this movement of the piston 41, the channel 50 and holes 51 provide a relatively free communication between the spaces 46 and 52 so that the pressure within them is substantially equal. Since all the piston and cylinder devices 20 are connected to the ring manifold 28 and the cylinder space 46 of the master piston and cylinder device 22 is also connected to the ring manifold 28, the pressure of the liquid in the piston and cylinder devices 20 is controlled to oppose angular displacement in the direction of arrow 29 of the annulus gear 19. During positive torque transmission the piston and cylinder devices 21 are inoperative since the pressure on each side of their pistons 31 are substantially equal, their cylinder spaces to the right of their pistons being connected to the ring manifold 38 and their cylinder spaces to the left of their pistons being connected to the ring manifold 28.

On negative torque transmission, the annulus gear 19 is displaced angularly in the direction of arrow 64 on FIGURE 4 and the pistons 31 of the piston and cylinder devices 21 and the piston 41 of the master piston and cylinder device are moved correspondingly. This movement of piston 41 reduces the area of communication between the cylinder space 52 and the channel 50 and reduces the extent that the cutaways 45 enter into the hollow boss 44 thus providing a freer communication between spaces 46 and 48 so that the pressure within the cylinder space 52 rises above that within the cylinder space 46. A corresponding rise of pressure occurs within the cylinder spaces of the piston and cylinder devices 21 connected to the ring manifold 38 and a corresponding fall of pressure occurs in the other cylinder spaces which are connected to the cylinder space 46 via the connections 34 and the ring manifold 28. Likewise there is a fall of pressure within the piston and cylinder devices 20. As a result of this variation of pressure within the piston and cylinder devices movement of the annulus gear 19 in the direction of arrow 64 (FIGURE 4) is opposed. It will be clear that the pressure in the ring manifold 28 will fall to a low value since, when the piston 41 moves to the left, the cutaways 45 project to a substantial extent from the hollow boss 44 and there is a substantially free outflow to the outlet connection 49 from space 46.

As the negative torque increases so the pressure within the space 52 increases, and when the pressure within this space reaches a selected value determined by the load of the spring 65 on valve 54, the valve 54 opens placing the spaces 52 and 46 in freer communication. As a result the piston 41, and with it the pistons 31, move sharply towards the annulus gear 19 allowing a corresponding angular movement of the annulus gear in the direction of arrow 64 and this movement continues until the holes 53 in the piston rod are covered by passing into the wall of the cylinder 40, to such an extent that the pressure within the cylinder space 52, and also in the corresponding spaces of the piston and cylinder devices 21 rises to a suitable value. The spring-loaded valves 54a provided in the devices 21 act only if the valve 54 fails to blow-off.

This sharp movement of the annulus gear 19 is employed to cause adjustment of the propeller driven by the epicyclic gearing to coarsen its pitch and thereby to slow down the propeller.

Figures 8, 9:
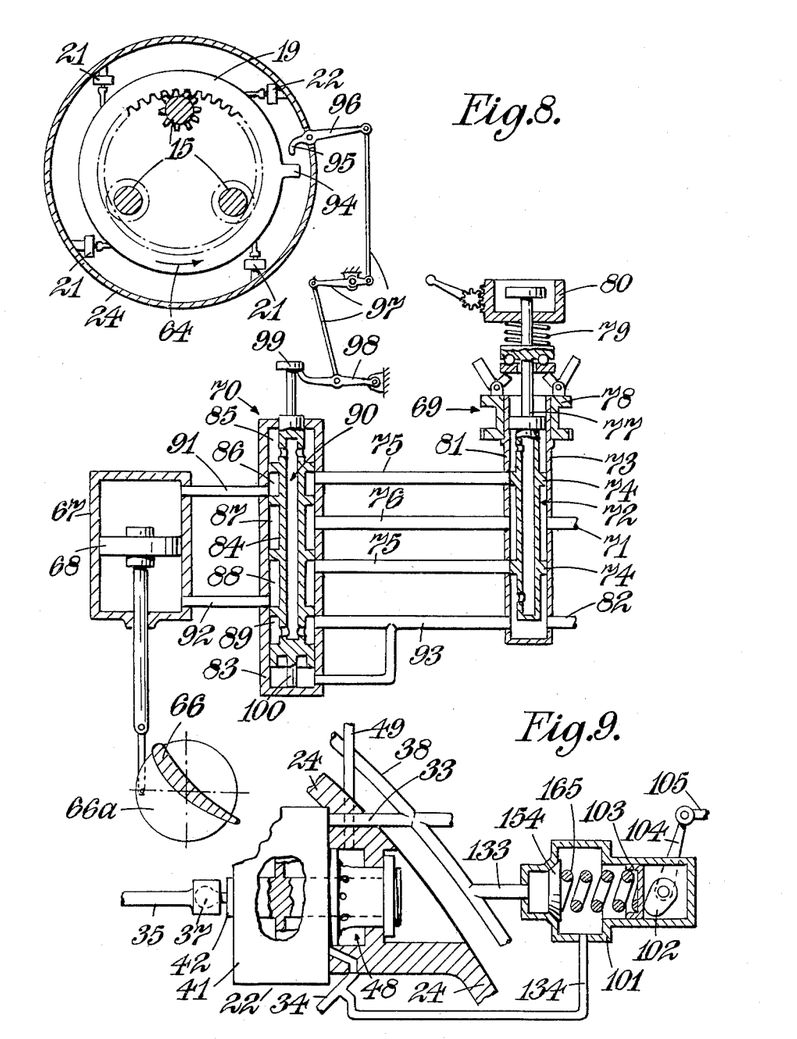
FIGURE 8 illustrates means for effecting a desired control on the propeller of the power plant.
FIGURE 9 shows a modification.

This effect may be achieved by a mechanism such as is shown in FIGURE 8.

Referring now to FIGURE 8, a propeller blade is indicated at 66. The pitch of the blade 66 is adjustable by a servo motor 67 whereof the piston 68 is linked to the blade root 66a. On upward movement of the piston 68 as viewed in FIGURE 8 the pitch of the blade 66 is fined off and on downward movement of the piston 68 the pitch of the blade is coarsened.

The supply of operating fluid to the servo motor 67 is controlled by a constant speed unit 69 and by a further valve 70 which is actuated by the movement under negative torque of the annulus gear 19.

The pressure fluid system of the servo motor 67 comprises a pressure liquid supply pipe 71 leading to an annulus 72 in a piston valve member 73, the annulus being bounded by a pair of lands 74 on the piston valve member. The lands 74 normally cover the ends of a pair of pipe connections 75 leading to the valve 70, and a further pipe connection 76 is provided from the annulus 72 to the valve 70. The piston valve 73 is connected by a stem 77 to a fly-bob speed responsive device 78 which lifts the piston valve as the propeller rotational speed increases and lowers the piston valve 73 as the propeller rotational speed decreases. The piston valve 73 is also loaded by a spring 79 having an adjustable abutment 80 by means of which the spring load can be set to select the desired rotational speed of the propeller. By increasing the load of spring 79 on the piston valve 73, the selected rotational speed is increased and by decreasing the spring load the selected rotational speed is decreased.

The piston valve member 73 has a central bore which communicates with the spaces within the casing 81 enclosing the piston valve 73 beyond the lands 74 and a return fluid connection 82 communicates with one of these spaces. It will be seen that on upward movement of the piston valve 73 one of the supply pipes 75 is placed in communication with the annulus 72 and the other pipe 75 is placed in communication with the return pipe 82. On downward movement of the piston valve 73 the connections of the pipes 75 are reversed.

The valve 70 comprises a casing 83 and a piston valve member 84 sliding within the casing 83, the piston valve member having a series of lands defining a corresponding series of annular fluid spaces 85, 86, 87, 88, 89, of which the spaces 85 and 89 are connected by a bore 90 in the piston valve 84.

The pipes 75 are open respectively to the spaces 86 and 88, the pipe 76 opens to the space 87 and there is also provided a pipe connection 91 from the space 86 to the upper side of the piston 68 of the servo motor 67, a pipe connection 92 from the space 88 to the lower side of the piston 68 and a return pipe 93 connected to the space 89 and the lower end of the valve casing 83. The lands defining the spaces 85–89 are arranged so that when the valve 84 is raised from the position shown in FIGURE 8 the pipe connection 91 is placed in communication with the space 87 and thus with the supply pipe 76, and the pipe connection 92 is placed in communication with the space 89 and thus with the return pipe 93. With the valve in the lifted position pressure fluid is supplied to the upper side of the piston 68 of the servo motor 67 and the pitch of the propeller blade 66 is coarsened.

The piston valve 84 is lifted under control of the annulus gear 19 by providing a lug 94 on the annulus gear which, on the occurrence of the sharp displacement of the annulus gear in the direction of arrow 64 as described above, bears against the nose 95 of a lever 96 and rocks it. The lever is connected through a linkage 97 to a further lever 98 engaging an abutment 99 on the upper end of the piston valve 84 so that when the lever 96 is rocked the piston valve is lifted by the lever 98.

When after lifting of the piston valve 84, the negative torque falls below the selected value, the lug 94 moves clear of the nose 95 on the lever 96 so permitting the piston valve 84 to fall. The downward travel of the piston valve 84 is limited by a projection 100 contacting the lower end of the valve casing 83.

When the piston valve 84 returns to the position shown in FIGURE 8 the pitch of the propeller blade 66 is again controlled by the constant speed unit 69 and, since normally the rotational speed of the propeller will be lower than that at which the unit 69 is set to govern the propeller, the piston valve 73 will be lowered from the position shown in FIGURE 8 so permitting pressure fluid to flow from the pipe 71 through annulus 72, the lower pipe 75, annulus 88 and pipe 92 to the underside of the piston 68 so raising the servo piston 68 and moving the propeller blade 66 to a finer pitch setting. The return fluid flows through pipe 91, annulus 86, the upper pipe 75, the bore in the piston valve 73 to return pipe 82.

Since it will be undesirable that the pitch coarsening mechanism as just described operates under certain conditions of flight of an aircraft, for instance during descent or landing approach, under which conditions considerable power feed-back occurs from the propeller to the engine, the value of negative torque at which the propeller blades 66 are moved to coarse pitch will be selected to be greater than values experienced during such power feed-back.

Figure 5:
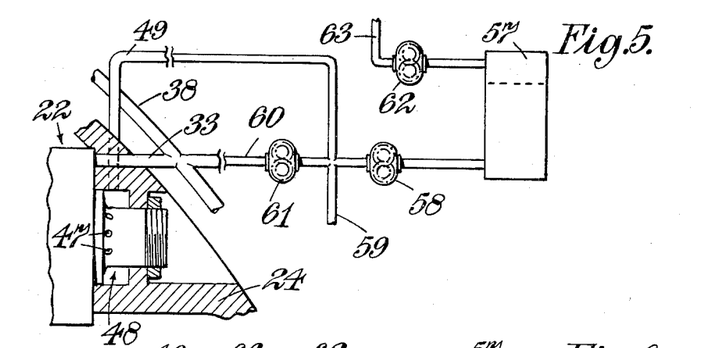

Referring now to FIGURE 5, there is illustrated an alternative form of the supply system to the piston and cylinder devices 20, 21 and 22. In this figure the reservoir is again shown at 57, the oil pressurising pump supplying the engine through pipe 59 is again shown at 58 and the pressurising pump for supplying the ring manifold 38 is again shown at 61 in a branch 60 from the supply pipe 59. In this case the outlet connection 49 from the master piston and cylinder device 22 is connected to deliver to the inlet side of the pump 61 and not to the scavenge pipe 63 from the engine oil system.

Figure 6:
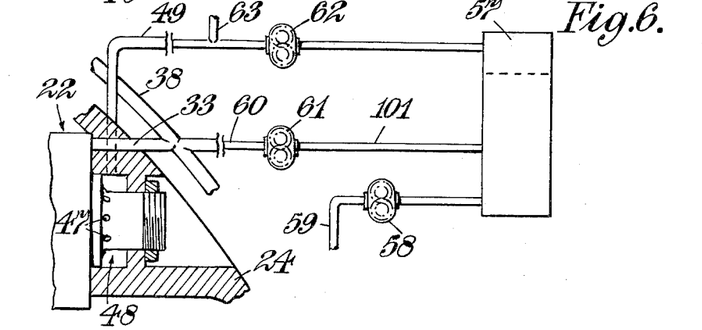

Referring now to FIGURE 6 yet another arrangement is shown and in this case the pressurising pump 61 for supplying the ring manifold 38 draws oil directly from the reservoir 57 through a pipe 101 and is not as in the two previous arrangements connected to the delivery side of the engine oil pump 58. In this construction as in the construction shown in FIGURE 3, the outlet connection 49 is connected to the scavenge pipe 63 of the engine oil system.

Figure 7:
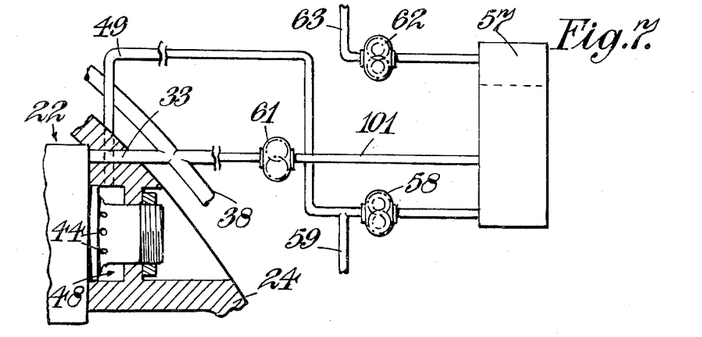

Referring now to FIGURE 7 the pump 61 is arranged as shown in FIGURE 6 to draw oil directly from the reservoir 57 through a pipe 101, but the outlet connection from the master piston and cylinder device 22 is connected to the delivery side of the engine oil pressursing pump 58.

Instead of providing the spring loaded valve 54 in the piston 41 of the master piston and cylinder device 22 and similar valves 54a in the devices 21, a corresponding spring loaded valve may be provided in a connection between the pressure connections 33 and 34 or between the ring manifolds 28, 38. Such an arrangement is shown in FIGURE 9 which is a view corresponding to FIGURE 3 of the master piston and cylinder device 22. In this modification the central bore is omitted from the piston rod 42 and there is provided a valve body 101 having a connection 133 to the manifold 38 and a connection 134 to pipe 34. A valve member 154 loaded by a spring 165 is provided within the valve body. The spring load to which the valve member 154 is subjected and therefore the value of negative torque at which the valve blows-off and the control action or warning is given, is varied by means of cam 102 which bears against a piston member 103 supporting the end of the spring. The cam 103 is adjusted by means of a lever 104 pivotally connected to a link 105 leading to the pilot's control lever, the arrangement being such that the selected value of negative torque is lower during take-off and climb and steady flight conditions than during descent and landing.

Figure 10:
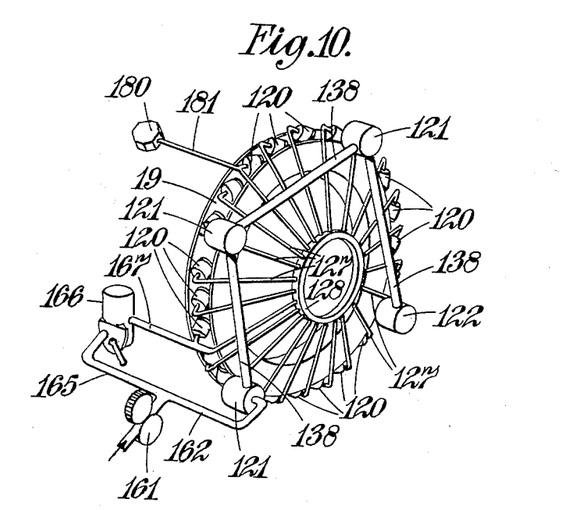
FIGURE 10 is a diagrammatic view of another form of hydraulic support for a reaction member of an epicyclic gear.
Figure 11:
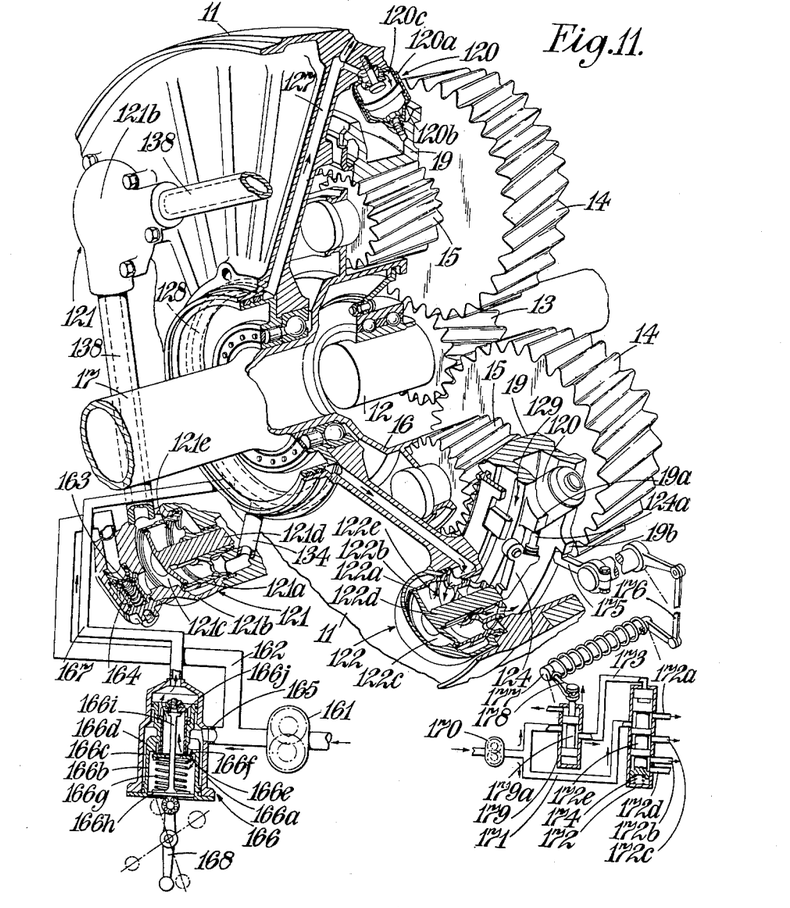
FIGURE 11 is a detailed perspective view with parts broken away of an epicyclic gear as shown in FIGURE 10.
Figure 12:
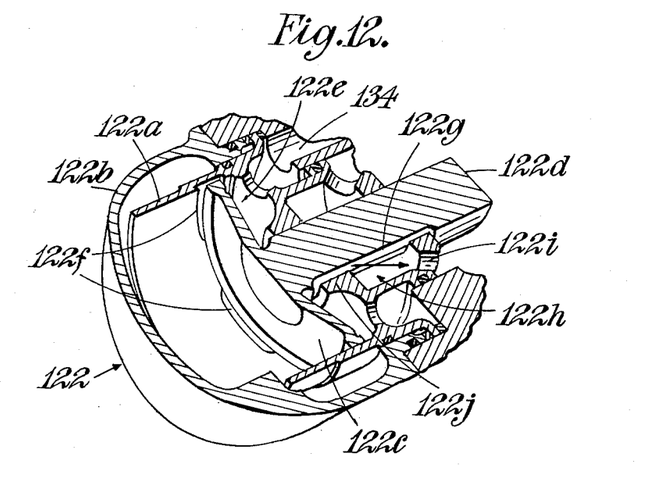
FIGURE 12 is a part of FIGURE 11 in an alternative position.

Referring now to FIGURES 10 to 12, there is shown an epicyclic reduction gear which is similar to that shown in FIGURE 1 and which comprises engine driven shaft 12 carrying sun gear 13, planet carrier 16 secured to propeller shaft 17 and carrying compound planet elements each of which has a pinion 14 meshing with the sun gear 13 and a pinion 15 meshing with an annulus gear 19 which constitutes the torque reaction member of the reduction gear. The reduction gear is housed in a casing structure including member 11. The gears 13, 19 and pinions 14, 15 have helical teeth.

The annulus gear 19 is supported in the casing during positive torque transmission by a large number of piston and cylinder devices 120 which are arranged in batches of six (see FIGURE 10) around the annulus, the axes of the devices 120 being inclined to a plane at right angles to the gear axis so that both tangential and axial reaction loads are transmitted from the annulus gear 19 to the casing structure through the devices 120. The devices are of similar construction to the devices 20 above described, each comprising a cylinder 120a (FIGURE 11) and a pair of piston elements 120b, 120c secured to the annulus gear 19 and casing member 11 respectively. Pressure oil is fed to the cylinders 120a through drillings 127 extending in the member 11 from an annular passage 128 as shown diagrammatically in FIGURE 10.

The annulus gear 19 is supported during negative torque transmission by four piston and cylinder devices, three of which are referenced 121 and one of which is referenced 122 (FIGURES 10 and 11), arranged with their axes parallel to the gear axis.

Each of the devices 121, 122 comprises (FIGURES 11, 12) a cylinder 121a, 122a housed in a domed cover 121b, 122b secured to the casing member 11, and a piston 121c, 122c in the cylinder, the piston having a guide stem 121d, 122d sliding in an end wall of the cylinder, the opposite end of which is open to the space within the cover 121b, 122b. The covers 121b, 122b are connected hydraulically together by pipes 138 and the cylinder spaces 121e, 122e on the other sides of the pistons are connected by drillings 134 to the annular passage 128.

The piston stems 121d, 122d are engaged by bell-cranks 124 which are mounted on the casing structure and which are rocked through spherical headed push rods 124a extending between them and lugs 19a on the annulus gear 19. On negative torque transmission, the bell-cranks 124 are rocked to displace the pistons 121d, 122d axially to the left as viewed in FIGURE 11.

The piston and cylinder device 122 is arranged to act as a master device for controlling the pressure of the oil in devices 120 during positive torque transmission. For this purpose, the inner surface of cylinder 122a, is recessed as shown at 122f in FIGURE 12, so that, when the piston 122c is in the positive torque position shown in this figure, the two sides of the piston are in free communication, and the stem 122d is formed with a longitudinal channel 122g leading to a chamber 122h having outlets 122i to a region of low pressure. With the piston 122c in the position of FIGURE 12, the outflow from space 122e to chamber 122h is restricted by co-operation of the end of channel 122g and a neck 122j. On increase in positive torque the piston 122c moves to the right and the restriction to outflow through channel 122g increases, so that the pressure within space 122e, and also within the devices 120, which connected with this space through drilling 134, passage 128 and drillings 127, increases. Conversely, movement to the left of piston 122c reduces the restriction to outflow from space 122e and therefore the pressure acting in devices 120 decreases.

Pressure oil is fed to the system by a pump 161 through pipe 162 leading to the cover 121b of one of the devices 121 and a non-return valve is housed in this cover. The valve comprises a disc element 163 loaded towards its closed position by a light spring 164.

A branch pipe 165 leads from pipe 162 to a further valve 166 and the outlet of this valve is connected by pipe 167 to the annular passage 128. The valve 166 comprises a casing 166a to which pipes 165 and 167 are connected and a liner 166b fitted within the casing to form an annular inlet space 166c. The liner 166b has an annular seat 166d for a ring valve element 166e and a series of drillings 166f from space 166c to the seat 166d so that oil can flow from the space 166c to within the liner 166b under control of the valve element 166e. The valve element 166e is loaded by a spring 166g having an abutment 166h which is adjustable under control of a pilot's lever 168. The abutment 166h is carried by a rod 166i secured to a hollow guide member 166j which is slidable within the liner 166b.

The valve 166 operates to control the pressure within the devices 121, 122 during negative torque transmission and, by reason of the adjustable abutment 166h, the controlled pressure is adjustable by the pilot.

During negative torque transmission the pistons 121c, 122c are in the positions shown in FIGURE 11 and as will be seen the piston 122c is in a position in which space 122e is cut off from the interior of the cover 122b, the piston being to the left of the recesses 122f. The pressure to the left of pistons 121c, 122c is thus the delivery pressure of pump 161, the non-return valve 163, 164 being arranged so that it is not completely closed under these conditions, and the pressure to the right of the pistons 121c, 122c is the pressure downstream of valve 166, which pressure is communicated to the spaces 121e, 122e via pipe 167, passage 128 and drillings 134. It will thus be clear that the hydraulic load urging the pistons 121c, 122c to the right to support the annulus gear 19 during negative torque transmission is determined by the pressure drop across valve 166.

The non-return valve 163, 164 is provided to cater for abnormal negative torque conditions such for instance as may occur on a sudden cut in engine power. Under these conditions the pistons 121e, 122e tend to move rapidly to the left expelling oil from the devices 121, 122 through the non-return valve which consequently closes trapping oil in the devices 121, 122. The piston 122c is not provided with sealing rings so that a leak can occur across it under these conditions. Thus rapid movement of the annulus gear in the reverse torque direction, see arrow 129 FIGURE 11, is prevented.

As in the constructions previously described, a control action is effected on the propeller carried by shaft 17 on occurrence of negative torque. Part of the hydraulic system of the propeller pitch change mechanism is shown in FIGURE 11. This system comprises a pump 170 providing pressure oil to the system via pipe 171 and valve 172. The valve 172 has an outlet pipe 172a leading to the coarse pitch side of the hydraulic motor of the pitch change gear, a pipe 172b leading to the fine pitch side of the motor, a pipe 172c leading to the normal constant speed control valve of the system and a drain pipe 172d. The valve includes a moveable valve member 172e which is moved downwardly against spring 174 by oil pressure delivered to the valve 172 via pipe 173 which contains a further valve 179 operated by negative torque movement of the annulus gear 19. On occurrence of a given negative torque, nose 19b on the annulus gear 19 engages and rocks lever 175 which through linkage 176 rocks a shaft 177 carrying an arm 178. The arm 178 engages movable element 179a of valve 179 and lifts it to the position shown permitting oil to flow to the pipe 173. Thus valve member 172e is moved downwardly so connecting pipe 171 to pipe 172a, and pipe 172b to pipe 172d so that the propeller pitch is coarsened (i.e. the propeller is feathered). During normal operation of the engine, pipe 173 is cut off from the delivery pump 170, and oil delivered by the pump is fed via valve 172 and pipe 172c to the valve of normal constant speed unit.

The arrangement shown may also be operated to enable windmilling drag to be obtained from the propeller during landing. To achieve this effect, lever 168 (FIGURE 11) is connected to move with the engine throttle lever and to increase the load of spring 166g on the valve element 166e as the engine is throttled down. Thus, since, as the engine is throttled down, the annulus gear 19 moves towards the negative torque position shown at least to a position in which the piston 122c is clear of the recesses 122f, it can be arranged by suitable selection of the load of spring 166g that the hydraulic load opposing negative torque movement of annulus gear 19 is sufficient to prevent movement of the annulus gear 19 to a position in which valve 179 is operated to feather the propeller.

We claim:

1. In a power plant comprising an engine, a variable-pitch propeller, epicyclic gearing drivingly interconnecting the engine and the propeller to transmit torque therebetween, and fixed structure housing the gearing; said epicyclic gearing including an annulus gear forming a torque reaction member of the gearing; means comprising a large number of piston and cylinder devices supporting said annulus gear within the fixed structure for limited angular movement from a neutral position, a pressure fluid supply supplying all said piston and cylinder devices, a first set of the piston and cylinder devices supporting the annulus gear for movement in one direction from said neutral position during positive torque transmission and a second set of said devices supporting the annulus gear for movement in the opposite direction from said neutral position during negative torque transmission, the extent tof such movements being dependent on the value of the torque transmitted; a motor connected to the variable-pitch propeller to adjust the pitch thereof, and control means actuated by said annulus gear on movement to a preselected extent front said neutral position in said opposite direction and connected on such actuation to cause operation of the motor to coarsen the pitch of the propeller.

2. A power plant according to claim 1, comprising a valve connected to be actuated by movement of the piston of one of said piston and cylinder devices in its cylinder and controlling the fluid pressure of said supply to increase as the negative torque increases.

3. A power plant according to claim 1, said motor being an hydraulic motor, and comprising means supplying operating fluid to said motor and including a control valve, a lug carried by said annulus gear to move therewith, a lever pivoted to said fixed structure and having an end in the path of movement of said lug during negative torque transmission, said lug engaging and rocking said lever on movement of said annulus gear to a preselected extent from said neutral position in said opposite direction, said lever being connected to actuate said control valve on being rocked to cause supply of operating liquid to the hydraulic motor in the sense to coarsen the pitch of the propeller.

4. A power plant according to claim 1, the annulus gear being helically toothed, and the piston and cylinder devices having their axes inclined to the plane of the annulus gear so that the annulus gear is supported both against axial loads produced in torque transmission and against tangential loads produced in torque transmission.

5. A power plant according to claim 1, said annulus gear being helically toothed, and said first set of piston and cylinder devices having their axes inclined to the plane of the annulus gear so that it is supported under positive torque conditions both axial reaction loads and tangential axial loads, and said second set of piston and cylinder devices having their axes directed axially of the annulus gear, and means transmitting movement of the annulus gear under negative torque conditions to displace the pistons of the second set of devices.

6. A power plant according to claim 1, one of said second set of piston and cylinder devices being employed as a master device and incorporating a valve controlling the pressure of the pressure fluid supply to the devices under both positive and negative torque conditions.

7. A power plant according to claim 6, the piston of the master device dividing the cylinder of the master device into two spaces, and comprising a first connection from said pressure fluid supply to the first space, an outlet from the second space, a flow connection between the two spaces, the piston on movement in one sense co-operating with the outlet to restrict flow therethrough to determine the liquid pressure acting in the piston and cylinder devices operative during torque transmission in one sense, the flow connection affording a substantially free flow between the spaces, and on movement in the other sense, the piston co-operating with said flow connection to restrict flow therethrough between the spaces thereby to determine the fluid pressure in the first space of the master piston and cylinder device and thus within the piston and cylinder devices operative during torque transmission in the other sense, the outlet being opened to afford a substantially free flow therethrough.

8. A power plant according to claim 7, the piston of the master device having an axial projection provided with longitudinal cutaways, a hollow boss in the cylinder of the master device to provide the outlet restriction of which is varied on movement in said one sense, said axial projection extending within the hollow boss, and the cylinder having an internal wall having channel means therein providing said flow connection, the piston according to its position in the cylinder covering said channel to a varying extent.

9. A power plant according to claim 7, said movement of the piston of the master device in said other sense occurs under negative torque conditions, and comprising a spring-loaded valve connection between the first and second spaces of the master piston and cylinder to open when the pressure within the first space reaches a selected value corresponding to the selected value of negative torque at which a control action is required to be effected, thereby to allow a rapid movement of the piston in the sense of reducing the volume of the first space and corresponding movement of the annulus gear, which movement is employed to effect the control action.

10. A power plant according to claim 9, said spring-loaded valve connection being in the piston of the master device and having an inlet thereto from said first space, which inlet is partially covered at the end of said rapid movement to restrict flow through the spring-loaded connection and cause an increase in pressure within the first space.

11. A power plant according to claim 9, comprising first and second liquid manifolds, said master device having connections from said first and second spaces respectively to said first and second liquid manifolds, and said spring-loaded valve connection joining the manifolds.

12. A power plant according to claim 11, wherein said spring-loaded valve connection comprises a valve seat, a valve member, a manually-adjustable abutment and a spring extending between the abutment and the valve member and loading the valve member on to the seat.

13. A power plant according to claim 1, one of said second set of the piston and cylinder devices being employed as a master device and comprising valve means forming part of the master piston and cylinder device and operated by movement of its piston to control pressure in the devices supporting the annulus gear under positive torque conditions, and additional manually-settable valve means controlling pressure in the piston and cylinder devices which are operative under negative torque conditions.

14. A power plant according to claim 13, the piston of the master device dividing its cylinder into a first space and a second space, and comprising a pressure supply connection to the first space, an outlet from the second space, and a flow connection between the spaces, said piston, when in a position occupied under positive torque conditions, rendering operative the flow connection between said spaces and co-operating with said outlet to restrict the outflow therethrough, and said piston, when in a position occupied under negative torque conditions, rendering said flow connection inoperative, said additional manually-settable valve means being in a further flow connection between the pressure supply connection and the second space.

15. A power plant according to claim 14, comprising a non-return valve connected in said pressure supply connection between the first space and the point of connection thereto of said further flow connection.

16. A power plant connection according to claim 13, wherein said manually-settable valve means comprises a valve body, annular seating means within said body defining an annular inlet port, an annular valve member co-operating with said port, an abutment, manually-settable means for adjusting said abutment, and a spring extending between said abutment and the valve member to urge it towards the seating means.

References Cited in the file of this patent

UNITED STATES PATENTS

| | | |
|---|---|---|
| 2,518,708 | Moore | Aug. 15, 1950 |
| 2,562,710 | Gallo et al. | July 31, 1951 |
| 2,645,293 | Ogle et al. | July 14, 1953 |
| 2,801,701 | Coar | Aug. 6, 1957 |
| 2,926,732 | Chamberlin | Mar. 1, 1960 |

FOREIGN PATENTS

| | | |
|---|---|---|
| 715,133 | Great Britain | Sept. 8, 1954 |
| 723,688 | Great Britain | Feb. 9, 1955 |